United States Patent
Peng et al.

(10) Patent No.: US 8,279,931 B2
(45) Date of Patent: Oct. 2, 2012

(54) MOTION VECTOR ESTIMATOR FOR REDUCING FILM JUDDER

(75) Inventors: Yuan-Chih Peng, Jhubei (TW); Yen-Lin Chen, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 448 days.

(21) Appl. No.: 12/588,134

(22) Filed: Oct. 6, 2009

(65) Prior Publication Data

US 2010/0201888 A1    Aug. 12, 2010

(30) Foreign Application Priority Data

Feb. 12, 2009   (TW) ................................ 98104467 A

(51) Int. Cl.
*H04B 1/66* (2006.01)
*H04N 7/12* (2006.01)
*H04N 11/02* (2006.01)

(52) U.S. Cl. ................................. 375/240.16
(58) Field of Classification Search .............. 375/240.16
See application file for complete search history.

(56) References Cited

U.S. PATENT DOCUMENTS

2001/0019586 A1*  9/2001  Kang et al. ............... 375/240.16
2003/0007667 A1*  1/2003  Ernst et al. ................... 382/107

FOREIGN PATENT DOCUMENTS

EP        0722252       *  7/1996

OTHER PUBLICATIONS

Gerard de Haan, Paul W.A.C. Biezen, Henk Huijgen, and Olukayode A. Ojo; True-Motion Estimation with 3-D Recursive Search Block Matching; IEEE Transactions on Circuits and Systems for Video Technology; Oct. 1993; p. 368-379; vol. 3, No. 5.

* cited by examiner

*Primary Examiner* — Joseph Ustaris
*Assistant Examiner* — Anner Holder
(74) *Attorney, Agent, or Firm* — Bacon & Thomas, PLLC

(57) ABSTRACT

A motion vector estimator for reducing film judder measures a motion vector of a block of an image. A motion vector selection device receives a plurality of motion vectors and generates N candidate vectors based on a motion estimation stage signal. N block matchmakers are connected to the motion vector selection device in order to generate N matching costs based on the N candidate vectors. A motion vector determinator is connected to the N block matchmakers and the motion vector selection device in order to determine an output motion vector of the block based on the N matching costs.

10 Claims, 7 Drawing Sheets

US 8,279,931 B2

MOTION VECTOR ESTIMATOR FOR REDUCING FILM JUDDER

CROSS REFERENCE TO RELATED APPLICATION

This application claims the benefits of the Taiwan Patent Application Serial Number 98104467, filed on Feb. 12, 2009, the subject matter of which is incorporated herein by reference.

BACKGROUND OF THE INVENTION

1. Field of the Invention

The present invention relates to the technical field of image processing and, more particularly, to a motion vector estimator for reducing film judder.

2. Description of Related Art

In shooting a film, movie signals are progressively scanned to thus produce progressively scanned frames. In order to transmit the movie signals in a television system (e.g., an NTSC or PAL system), the progressively scanned frame has to be divided into multiple fields. For displaying on a television, a de-interlacing scanner combines multiple fields belonging to the same frame and accordingly restores the progressively scanned frame.

However, the rate is 60 Hz for the shot fields of a television program, and it is 24 Hz for the shot frames of a film, which is lower than 60 Hz and thus causes serious film judder. For reducing the film judder caused by the lower frame rate, a motion estimation is used to find the moving speed of an object, and subsequently a motion compensation is used for an original frame to generate other time points based on the motion vectors and the tandem temporal frame data interpolation to thereby increase the final frame rate.

A motion estimation applied to such a frame rate conversion needs to find the true motion vectors of an object, not find the similar image portions only. The true motion vectors commonly have the highly spatial and temporal correspondence. U.S. Pat. No. 5,221,926 granted to Jackson for a "Circuit and method for cancelling nonlinearity error associated with component value mismatches in a data converter" is disclosed to add the known motion vectors found around a block and the different update vectors to generate a plurality of candidate vectors, perform a block matching on the candidate vectors to obtain the matching costs of each candidate vectors, and select a candidate vector with the smallest matching cost as the optimal vector for the block. Each block has a limited number of candidate vectors and a limited number of update vectors, but the recursive processing can be converged to the optimal motion vector.

An approach is proposed to select the spatial and temporal candidate vectors and perform a spatially and temporally recursive processing on the selected candidate vectors to thereby speed the convergence to the time of the true motion vector (see "True-Motion estimation with 3-D recursive search block matching", IEEE transactions on circuits and systems for video technology, Vol. 3, No. 5, October 1993). In addition, the block matching calculation is performed only on a plurality of candidate vectors in order to relatively reduce the computational amount required in the motion estimation.

As cited, the spatially and temporally recursive block matching can relatively reduce the computational amount in the motion estimation and maintain the spatial and temporal correspondence of each motion vector to thereby converge to the appropriate speed of the motion vector and further determine the quality of the recursive motion estimation. The speed of a motion vector convergence is determined by three factors: one being whether the appropriate motion vectors are included in the candidate vectors, another being the magnitudes of the update vectors, and the other being the penalty cost for determining each candidate vector. The penalty cost indicates the preference for different candidate vector origination. The recursive operation can be converged to the appropriate motion vector more quickly by means of such a preference. Since an operational processing commonly applied to a television is limited by the left-to-right, up-to-down scanning on a TV frame, the candidate vectors can originate from the left or upper portions where the block matching is complete or from the previously temporal motion vectors. When either the spatial or the temporal motion vectors that are currently selected are not appropriate, it is possible that the pixels are located at the boundaries of different-rate objects. Thus, updating the present motion vectors is required for obtaining the appropriate motion vectors, and the magnitudes of updated vectors can determine the changing speed to the appropriate motion vectors. The speed is increased with an increase on the magnitude. However, the increased magnitudes of updated vectors has a poor resolution, resulting in the problem of poor convergence precision or vector oscillation when the changed motion vector between the object images is small.

Such a motion estimation technology is essentially used to overcome the aforementioned film judder. As cited, the movie signals are shot by progressive scanning. When a conversion to an interlaced scan is required in transmission, a complete (simultaneous shooting) progressively scanned frame is divided into a plurality of odd and even fields to transmit. For example, a frame is divided into one odd field and one even field, which is referred to as a 2:2 pull down. FIG. 1 is a schematic diagram of a typical 2:2 pull down. As shown in FIG. 1, the original movie signals such as F0, F2, F4 are converted into the odd and even fields E0, O0, E2, O2, E4, O4 in transmission, and the results F0, F1, F2, F3, F4 are outputted after motion estimation and compensation, where F0 is obtained by combining E0 and O0, F1 is the result of motion estimation and compensation of E0, O0, E2, O2, and so on.

FIG. 2 is a block diagram of a typical device for reducing a film judder. As shown in FIG. 2, the input video signal has a movie format of 2:2 pull down. After passing through three field buffers 210, 220, 230, the fields E2, O2 and fields E0, O0 are inputted to the motion estimator 240 and the motion compensator 250, respectively. The motion estimator 240 outputs the motion vector MV, which is subsequently fed back to the motion estimator 240 through the delay 260 to accordingly provide a source of future candidate vectors in motion estimation. Thus, a recursive search motion estimation configuration is established via such a feedback path.

FIG. 3 is a block diagram of a typical recursive motion estimator 240. In FIG. 3, the motion estimator 240 includes a motion vector selector 310, multiple block matchmakers 320 and a motion vector determinator 330. The motion vector selector 310 selects a plurality of candidate vectors from the vector sources, each candidate vector is based on its source to generate a penalty cost so that different sources of candidate vectors can indicate different matching preferences, and a high penalty cost indicates a low preference for the candidate vector. The block matchmakers 320 performs block matching on the selected candidate vectors, calculates the difference between two successive time points of each candidate vector, and adds the difference and the penalty cost of each candidate vector to thereby obtain the final matching costs of the candidate vectors. The motion vector determinator 330 selects a candidate vector with the lowest matching cost as a result of the motion estimation, i.e., a signal MV. The signal MV outputted by the motion vector determinator 330 passes through the delay 260 and enters into the motion vector selector 310 for a reference during a candidate vector selection.

However, the candidate vector selection and the updated magnitude of the motion vector in such a recursive process frequently influence the convergence speed and precision. The prior art does not consider how to speed up the convergence on the basis of ensuring the convergence precision. Therefore, it is desirable to provide an improved motion vector estimator to mitigate and/or obviate the aforementioned problems.

SUMMARY OF THE INVENTION

The object of the present invention is to provide a motion vector estimator for reducing film judder, which can overcome the problem in the prior art that is unable to give consideration to both the convergence speed and precision.

To achieve the object, there is provided a motion vector estimator for reducing film judder, which measures a motion vector of a block of an image comprised of blocks of pixels arranged in a matrix form. The motion vector estimator includes a motion vector selection device, N block matchmakers and a motion vector determinator. The motion vector selection device has a plurality of motion vector selectors to receive a plurality of motion vectors respectively, each motion vector selector generating N candidate vectors based on its motion vector received, and is based on a motion estimation stage signal to select the N candidate vectors of a motion vector selector to output, where N is a positive integer. The N block matchmakers are connected to the motion vector selection device in order to perform a block matching on the N candidate vectors to thereby generate N matching costs respectively. The motion vector determinator is connected to the N block matchmakers and the motion vector selection device in order to determine an output motion vector of the block based on the N matching costs and feed the output motion vector back to the motion vector selection device.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
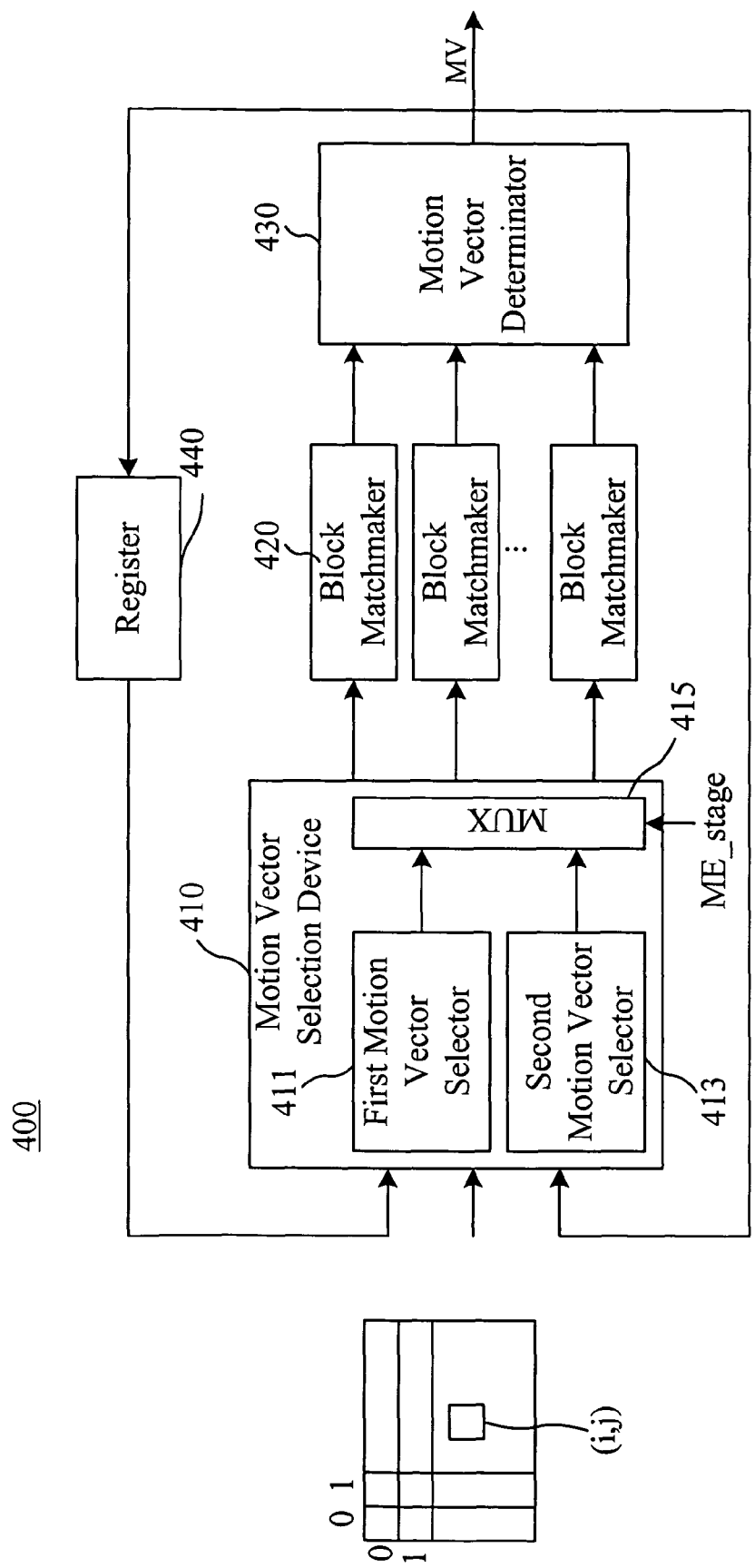
FIG. 4 is a block diagram of a motion vector estimator for reducing film judder according to an embodiment of the invention.

FIG. 4 is a block diagram of a motion vector estimator 400 for reducing film judder according to an embodiment of the invention. The motion vector estimator 400 measures the motion vector MV of a block in an image. The image is comprised of blocks of pixels arranged in a matrix form. A block at an i-th row and j-th column of the image is indicated by (i, j) where i, j are integers. The block can be comprised of 4×4, 6×6, 8×8 or 16×16 pixels. The motion vector estimator 400 includes a motion vector selection device 410, a plurality of block matchmakers 420, a motion vector determinator 430 and a register 440.

The motion vector selection device 410 receives a plurality of motion vectors and generates N candidate vectors, where N is a positive integer, based on a motion estimation stage signal (ME_stage).

The block matchmakers 420 are connected to the motion vector selection device 410 in order to perform a block matching on the N candidate vectors to thereby generate N matching costs corresponding to the candidate vectors. Each matching cost is obtained by performing a Sum of Absolute Difference (SAD) operation and adding a penalty cost corresponding to the candidate vector to the result.

The motion vector determinator 430 is connected to the block matchmakers 420 and the motion vector selection device 410 in order to selects a candidate vector with the smallest matching cost, determine an output motion vector MV of the block based on the matching costs and feed the output motion vector back to the motion vector selection device 410.

The register 440 is connected between the motion vector selection device 410 and the motion vector determinator 430 in order to temporarily store an output motion vector of the block of the last image and send it to the motion vector selection device 410. The motion vector determinator 430 further sends the output motion vectors of the blocks (i−1, j−1), (i−1, j), (i, j−1), (i−1, j+1), (i+1, j+1) of the present image to the motion vector selection device 410.

The motion vector selection device 410 has a first motion vector selector 411, a second motion vector selector 413 and a multiplexer 415.

Figure 5:
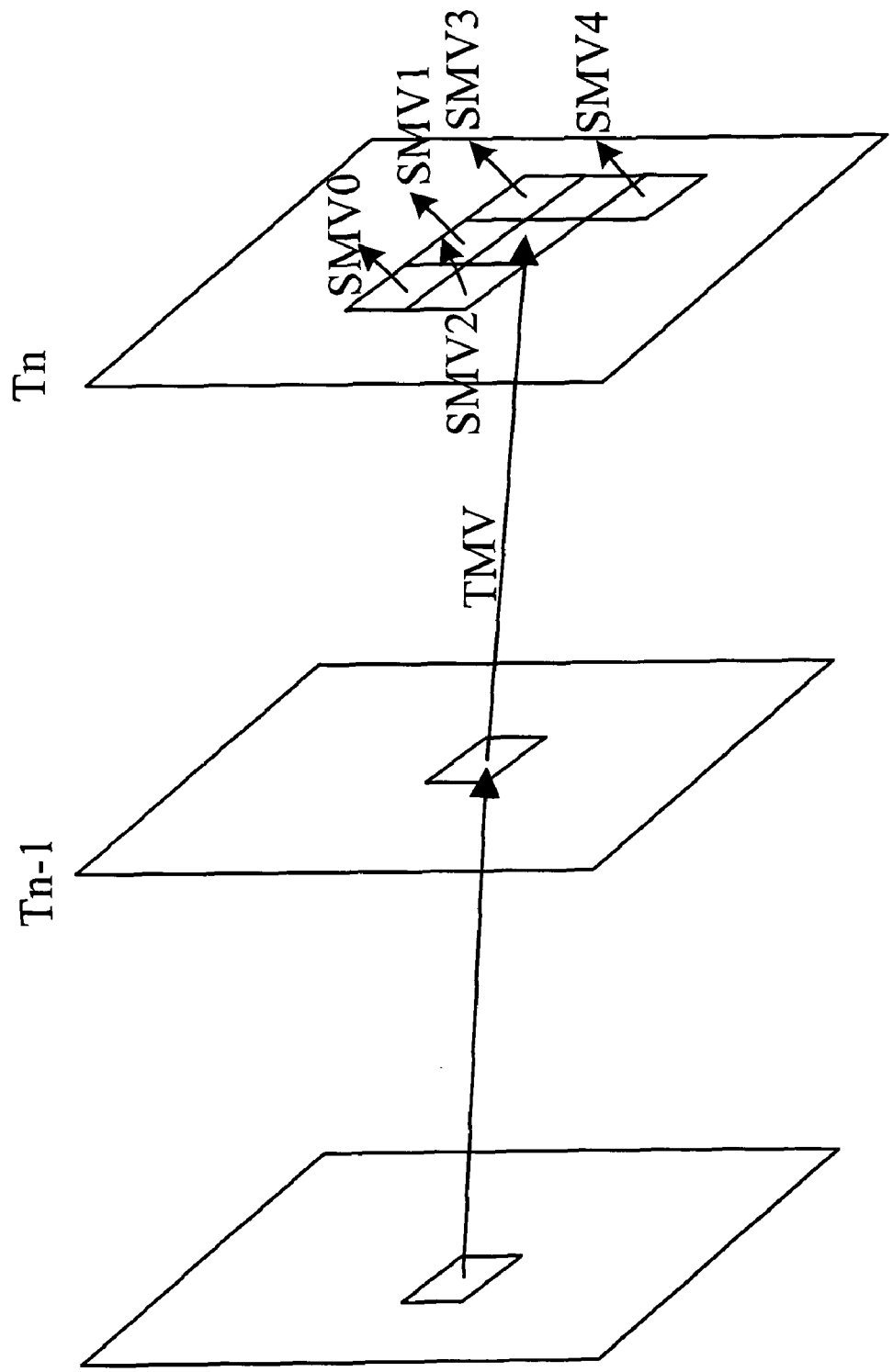
FIG. 5 is a schematic diagram of motion vectors according to an embodiment of the invention.

The first motion vector selector 411 receives an output motion vector TMV of the block (i, j) of the last image, an output motion vector SMV0 of the block (i−1, j−1) of the present image, an output motion vector SMV1 of the block (i−1, j) of the present image, an output motion vector SMV2 of the block (i, j−1) of the present image, and accordingly generates a first set of candidate vectors. FIG. 5 is a schematic diagram of motion vectors according to an embodiment of the invention. As shown in FIG. 5, the symbol TMV indicates the motion vector of the block (i, j) at the last time Tn−1, SMV0 indicates the motion vector of the block (i, j) with respect to the upper-left block (i−1, j−1) at present time Tn, SMV1 indicates the motion vector of the block (i, j) with respect to the upper block (i−1, j) at Tn, and SMV2 indicates the motion vector of the block (i, j) with respect to the left block (i, j−1) at Tn.

The second motion vector selector 413 receives the output motion vector SMV2 of the block (i, j−1), an output motion vector SMV3 of the block (i−1, j+1), an output motion vector SMV4 of the block (i+1, j+1), and accordingly generates a second set of candidate vectors. As shown in FIG. 5, the symbol SMV3 indicates the motion vector of the block (i, j) with respect to the upper-right block (i−1, j+1) at Tn, and SMV4 indicates the motion vector of the block (i, j) with respect to the lower-right block (i+1, j+1) at Tn.

The multiplexer 415 is connected to the first motion vector selector 411 and the second motion vector selector 413 in order to select the first set of candidate vectors and corresponding penalty costs or the second set of candidate vectors and corresponding penalty costs based on the motion estimation stage signal ME_stage for use as the candidate vectors and corresponding penalty costs for the motion vector selection device 410.

The multiplexer 415 selects the output of the first or the second motion vector selector 411 or 413 as the output of the motion vector selection device 410 based on the motion estimation stage signal ME_stage. The motion estimation stage signal ME_stage is determined by a current number of motion estimations taken in the same time interval. For example, when the frame F0 is outputted, the first-time motion estimation is performed in the F0 to F2 time interval, the motion estimation stage signal ME_stage is zero, and in this case the motion vector selection device 410 selects the output of the first motion vector selector 411 and corresponding penalty costs as an output. When the frame F1 (MC) is outputted, the second-time motion estimation is performed in the F0 to F2 time interval, the motion estimation stage signal ME_stage is one, and in this case the motion vector selection device 410 selects the output of the second motion vector selector 413 and corresponding penalty costs as an output.

The motion vector selection device 410 can have three or more motion vector selectors, depending on the relationship between the original frequency and display frequency of the movie signals. For example, if the speed of shooting a film is at 24 frames/second and the speed of displaying the video signals is at 48 frames/second, the motion estimation can be performed two times in the same time interval, and in this case two motion vector selectors are used; and if the speed of displaying the video signals is replaced with 72 frames/second, the motion estimation can be performed three times in the same time interval, and in this case three motion vector selectors are used.

Figure 6:
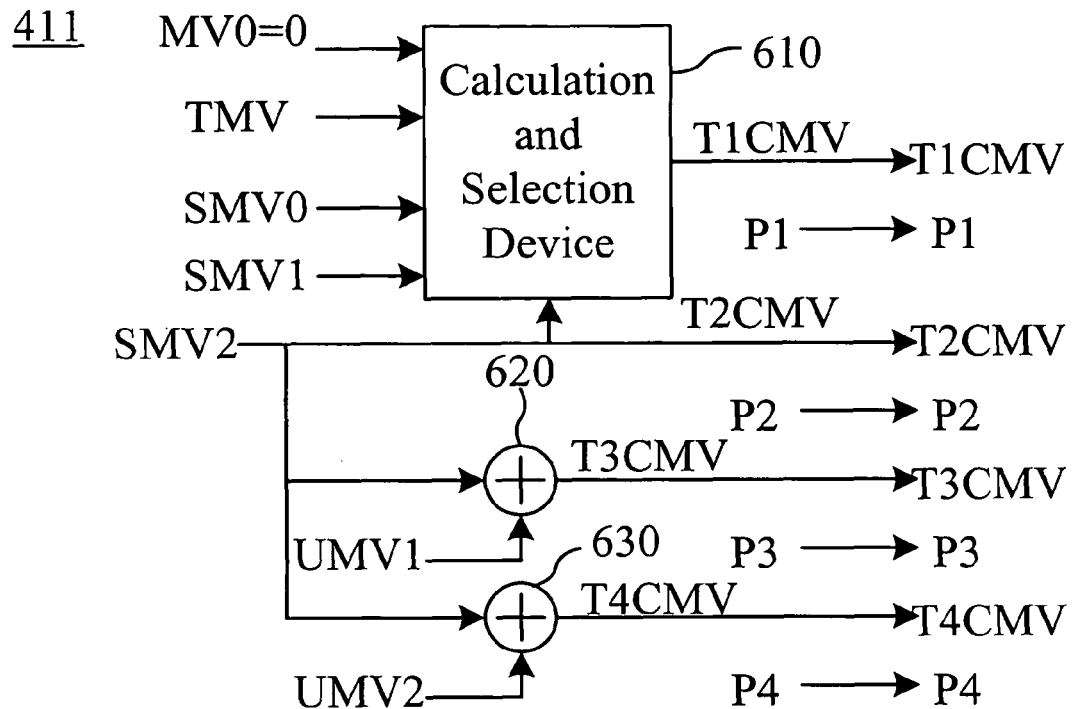
FIG. 6 is a block diagram of a first motion vector selector according to an embodiment of the invention.

FIG. 6 is a block diagram of the first motion vector selector 411 according to an embodiment of the invention. In FIG. 6, the first motion vector selector 411 has a calculation and selection device 610, a first adder 620 and a second adder 630.

The calculation and selection device 610 calculates the differences between the following four output motion vectors respectively, the output motion vector SMV2 of the block (i, j−1) of the present image and the predetermined motion vector MV0 (such as zero vector), the output motion vector TMV of the block (i, j) of the last image, the output motion vector SMV0 of the block (i−1, j−1) of the present image, the output motion vector SMV1 of the block (i−1, j) of the present image, and selects one with the greatest difference as a first candidate vector T1CMV to output.

The first motion vector selector 411 directly outputs the output motion vector SMV2 of the block (i, j−1) of the present image to be a second candidate vector T2CMV, uses the first adder 620 to add a first update vector UMV1 to the output motion vector SMV2 (i.e., T2CMV) to thereby generate a third candidate vector T3CMV, and uses the second adder 630 to add a second update vector UMV2 to the output motion vector SMV2 to thereby generate a fourth candidate vector T4CMV. The first motion selector 411 also outputs first to fourth penalty costs P1 to P4 corresponding to the first to fourth candidate vectors T1CMV to T4CMV respectively. The penalty costs are based on the sources of the candidate vectors to select a predetermined value to accordingly adjust the matching costs of the candidate vectors on block matching and reflect the preferences of the candidate vectors.

When the first update vector UMV1 is greater than the second update vector UMV2, the third penalty cost P3 is greater than the fourth penalty cost P4. When the first update vector UMV1 is not greater than the second update vector UMV2, the third penalty cost P3 is not greater than the fourth penalty cost P4.

The magnitude of the first update vector UMV1 is based on the remainder obtained by dividing a sum of horizontal and vertical positions x and y of the matched block (i, j) by four. When the remainder is zero, UMV1 is {+4, 0}; when the remainder is 1, UMV1 is {−4, 0}; when the remainder is 2, UMV1 is {+2, 0}; and when the remainder is 3, UMV1 is {−2, 0}. The value of the third penalty cost P3 is based on the absolute of the update vector UMV1. When |UMV1| is 4, the third penalty cost P3 is 40, and when |UMV1| is 2, the third penalty cost P3 is 20.

The second update vector UMV2 is added to the output motion vector SMV2 to thereby generate the fourth candidate vector T4CMV. The magnitude of the second update vector UMV2 is based on the remainder obtained by dividing a sum of horizontal and vertical positions x and y of the matched block (i, j) by two. When the remainder is zero, UMV2 is {0, −2}, and when the remainder is 1, UMV2 is {0, +2}. The value of the fourth penalty cost P4 is 20.

Figure 7:
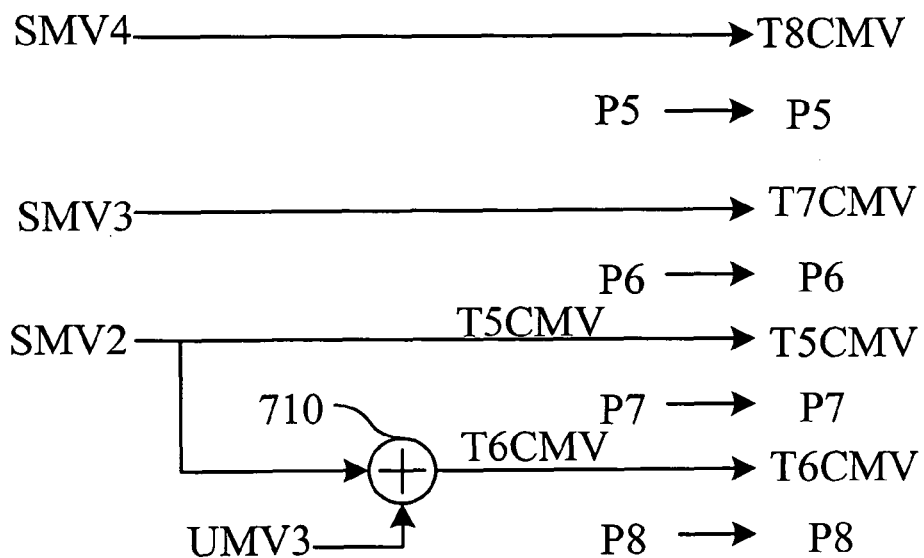
FIG. 7 is a block diagram of a second motion vector selector according to an embodiment of the invention.

FIG. 7 is a block diagram of the second motion vector selector 413 according to an embodiment of the invention. The second motion vector selector 413 has a third adder 710.

The second motion vector selector 413 directly outputs the output motion vector SMV2 of the block (i, j−1) to be a fifth candidate vector T5CMV, uses the third adder 710 to add a third update vector UMV3 to the output motion vector SMV2 (i.e., T5CMV) to thereby generate a sixth candidate vector T6CMV, directly outputs the output motion vector SMV3 of the block (i−1, j+1) to be a seventh candidate vector T7CMV, and directly outputs the output motion vector SMV4 of the block (i+1, j+1) to be an eighth candidate vector T8CMV. The first and the second update vectors UMV1 and UMV2 are greater or equal to the third update vector UMV3.

The second motion vector selector 413 also outputs the fifth to eighth penalty costs P5 to P8 corresponding to the fifth to eighth candidate vectors respectively. The penalty costs are based on the sources of the candidate vectors to select a predetermined value to accordingly adjust the matching costs of the candidate vectors on block matching and reflect the preferences of the candidate vectors. The fifth to eighth penalty costs are expressed as: $P5 \leq P7$, $P8 \leq P6$, where P5, P6, P7, and P8 indicate the fifth to eighth penalty costs respectively.

The second motion vector selector 413 selects the left block SMV2 as the fifth candidate vector such that the penalty cost P5 is zero, selects the upper-right block SMV3 as the seventh candidate vector such that the penalty cost P7 is five, selects the lower-right block SMV4 (calculated when ME_stage=0) as the eighth candidate vector such that the penalty cost P8 is five, and adds the block SMV2 and the third update vector UMV3 to thereby obtain the sixth candidate vector. The magnitude of the third update vector UMV3 is based on the remainder obtained by dividing a sum of horizontal and vertical positions x and y of the matched block (i, j) by four. When the remainder is zero, UMV3 is {+1, 0}; when the remainder is one, UMV3 is {−1, 0}; when the remainder is two, UMV3 is {0, +1}; and when the remainder is three, UMV3 is {0, −1}. The penalty cost is 10.

The second motion vector selector 413 can select the candidate vectors as same as those selected by the first motion vector selector 411 of FIG. 6, or obtain other output motion vectors by selecting the update vectors smaller than those selected by the first motion vector selector 411 and corresponding to different penalty costs.

Figure 1:
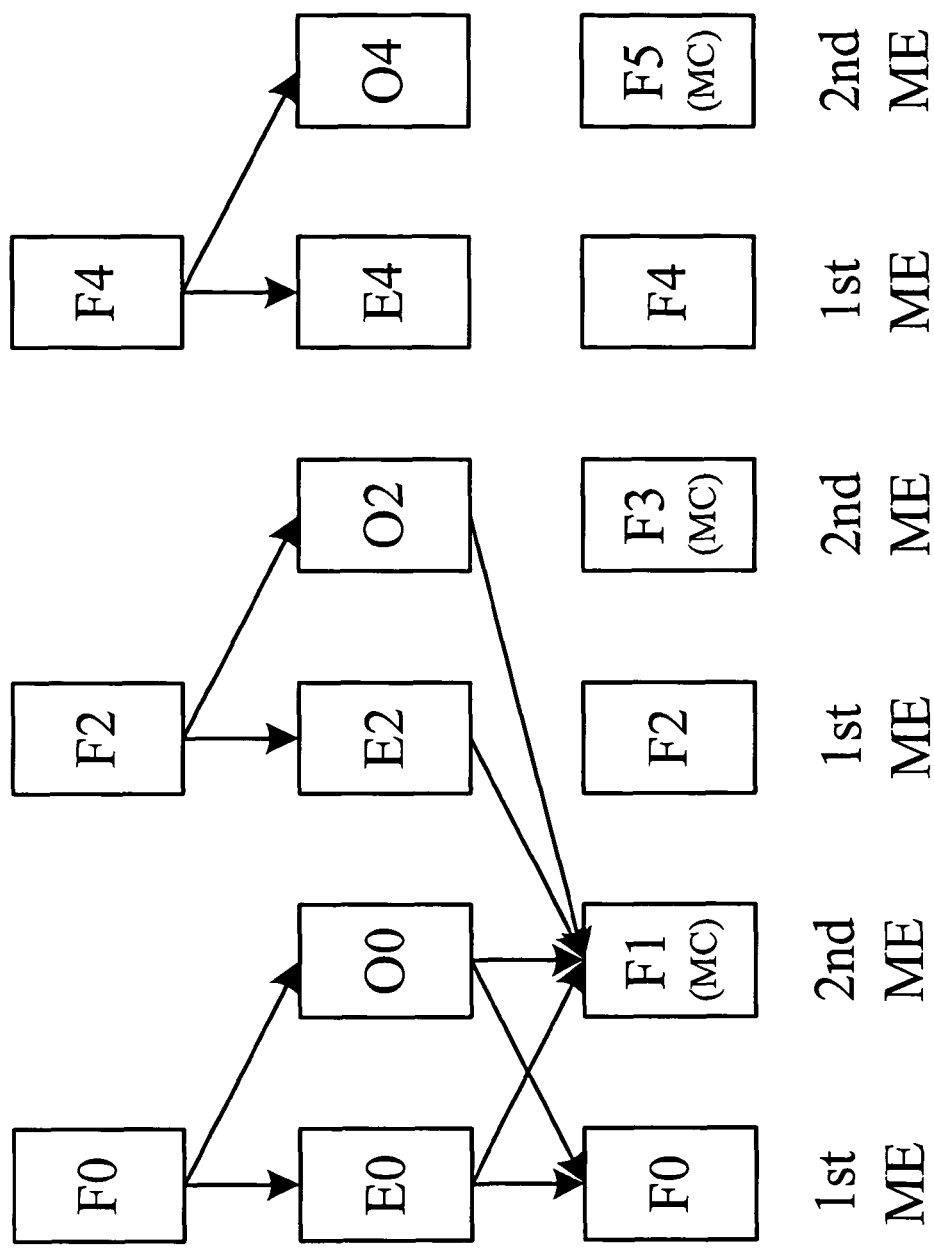
FIG. 1 is a schematic diagram of a typical 2:2 pull down.
Figure 2:
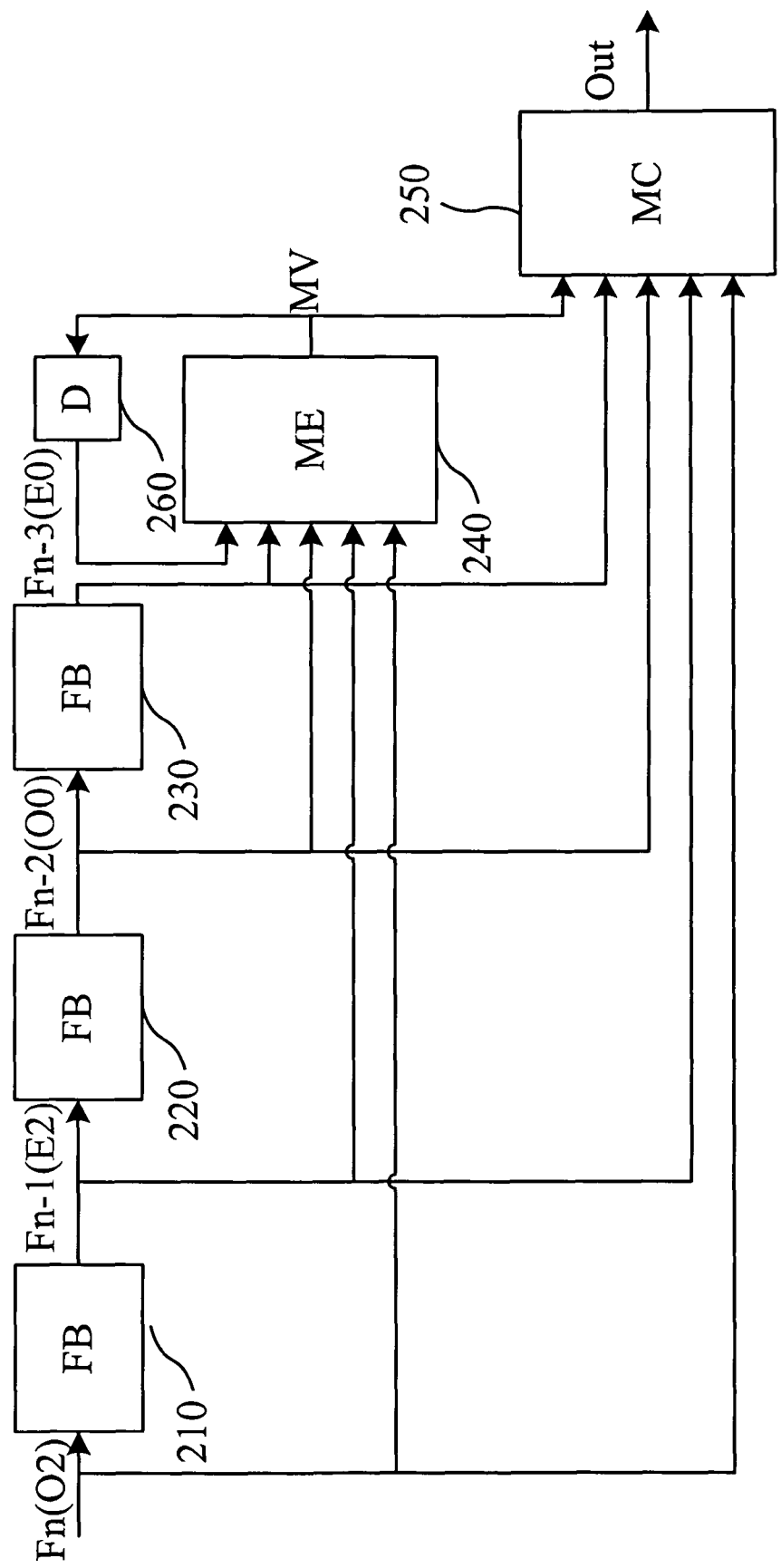
FIG. 2 is a block diagram of a typical device for reducing a film judder.
Figure 3:
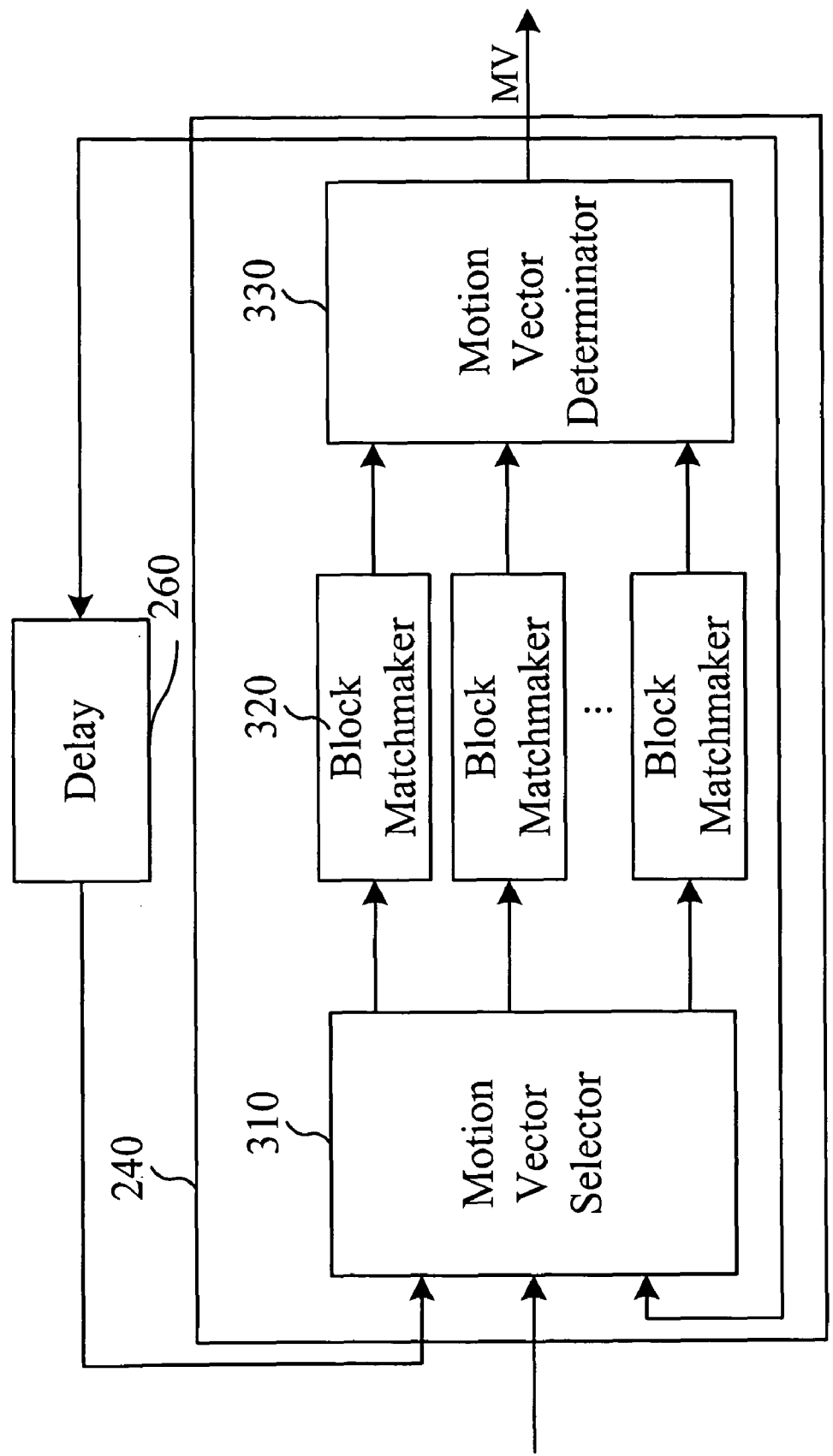
FIG. 3 is a block diagram of a typical recursive motion estimator.

As shown in FIG. 1, the original movie signals F0, F2, F4 are converted into E0, O0, E2, O2, E4, O4 in transmission. In addition, after the motion estimation and compensation are performed, F0 to F5 are outputted. F0 is obtained by combining E0 and O0, F1 is obtained after the motion estimation and compensation are performed on E0, O0, E2, O2, and so on. The invention is based on the feature of multiple outputs in the same time interval, such as F0 (directly combined) and F1 (the motion estimation and compensation are performed on F0 and F2) are outputted in the F0 to F2 time interval, at film mode to perform multiple motion estimations on the frames in the same time interval and further select the desired candidate vectors and corresponding penalty costs based on a number of motion estimations currently performed in the same time interval. For example, when the frame F0 is outputted, the first-time motion estimation is performed in the F0 to F2 time interval, and when the frame F1 (motion compensation on F0 and F2) is output, the second-time motion estimation is performed in the F0 to F2 time interval and the required motion vectors are generated for the current motion compensation. The first-time motion estimation can use greater update vectors to thereby obtain an initial motion vector field, and the second-time motion estimation uses smaller update vectors to thereby increase the precision of the motion vectors applied to the motion compensation. The invention also uses the motion estimation stage signal ME_stage to select the initial motion vector field at the first-time motion estimation or the motion vector field at the second-time motion estimation to thereby increase the precision of the motion vectors applied to the motion compensation.

Figure 8:
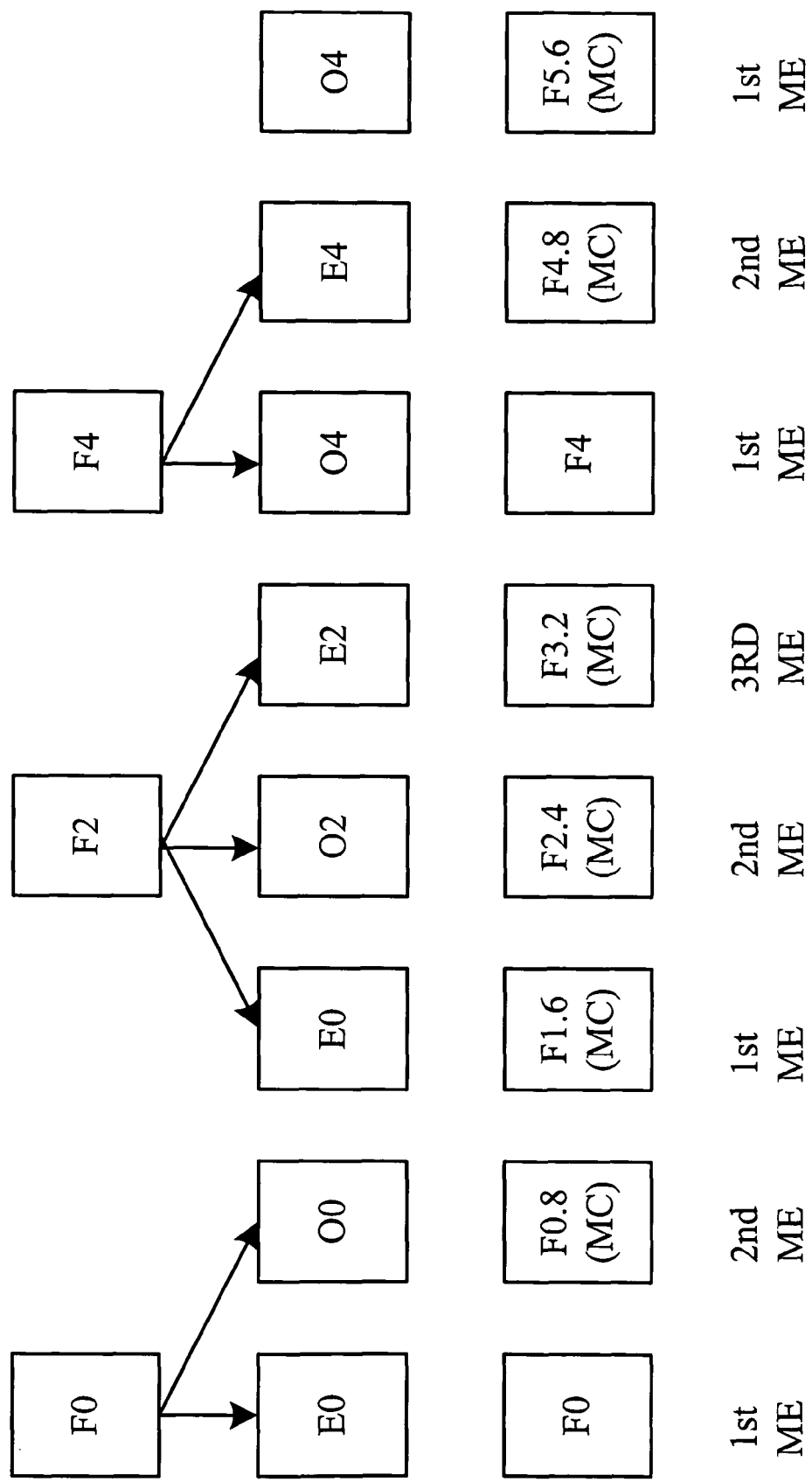
FIG. 8 is a schematic diagram of a typical 2:3 pull down.

The invention is also suitable for a format of 2:3 pull down. FIG. 8 is a schematic diagram of a typical 2:3 pull down. As shown in FIG. 8, for an LCD standard screen with a 60 Hz refresh frequency, when a DVD is played, the first frame is divided into two fields, the second one is divided into three fields, the third one is divided into two fields, the fourth one is divided into three fields, and so on. Accordingly, the signal is converted into a mode of 60 fields (or 30 frames)/second.

The first and the second motion estimations are based on the same selection manner to obtain the candidate vectors, but the penalty costs can be different. For example, the penalty costs corresponding to the candidate vectors obtained by adding the output motion vectors and the update vectors are small in the first motion estimation to thereby find the general motion vectors, and the penalty costs are increased in the second motion estimation since the motion vectors are not changed very large. In addition to adjusting the magnitudes of the update vectors, the left and the upper vectors in space are selected as the candidate vectors in the first motion estimation, and the right and the lower vectors are selected as the candidate vectors in the second motion estimation. Alternatively, the first motion estimation can refer to the TMV, but the second one does not refer to the TMV.

As cited, how to select the candidate vectors and the magnitudes of the update vectors has disclosed in the prior art, but the prior art does not disclose how to overcome the problem that on one hand the convergence precision is poor when a large update vector is selected to increase the speed of tending to the appropriate motion vector, and on the other hand the speed of tending to the appropriate motion vector become slow when a small update vector is selected to increase the convergence precision. Therefore, the invention discloses how to perform multiple motion estimations in a time interval and accordingly select different candidate vectors and/or use the different penalty costs to adjust the preferences of the candidate vectors. Namely, upon the results of the motion estimations, the appropriate motion vectors are selected to realize the precision and increase the speed of converging to the appropriate motion vectors. In addition, the second motion estimation in the invention can select the right and the lower candidate vectors of the block (i, j) obtained in the first motion estimation to increase the completeness of the candidate vectors and further increase the estimation precision.

Although the present invention has been explained in relation to its preferred embodiment, it is to be understood that many other possible modifications and variations can be made without departing from the spirit and scope of the invention as hereinafter claimed.

What is claimed is:

1. A motion vector estimator for reducing film judder, which measures a motion vector of a block of an image comprised of blocks of pixels arranged in a matrix form, a block at an i-th row and j-th column of the image being indicated by (i, j) where i, j are integers, the estimator comprising:

a motion vector selection device having a plurality of motion vector selectors to receive a plurality of motion vectors respectively, each motion vector selector generating N candidate vectors based on its motion vector received, and selecting the N candidate vectors of a motion vector selector to output based on a motion estimation stage signal, where N is a positive integer, in which the motion vector selection device comprises:

a first motion vector selector for receiving the output motion vector of the block (i, j) of the last image and the output motion vectors of the blocks (i−1, j−1), (i−1, j), (i, j−1) of the present image and generating a first set of N candidate vectors, wherein the first motion vector selector comprises a calculation and selection device, a first adder and a second adder, the calculation and selection device calculating differences between the output motion vector of the block (i, j−1) of the present image and a predetermined motion vector, the output motion vector of the block (i, j) of the last image, the output motion vector of the block (i−1, j−1) of the present image, and the output motion vector of the block (i−1, j) of the present image to accordingly select one with the greatest difference as a first candidate vector for output, the calculation and selection device directly outputting the output motion vector of the block (i, j−1) of the present image to be a second candidate vector, the first adder adding a first update vector to the second candidate vector to generate a third candidate vector, and the second adder adding a second update vector to the second candidate vector to generate a fourth candidate vector;

a second motion vector selector for receiving the output motion vectors of the block (i, j−1), (i−1, j+1), (i+1, j+1) of the present image and generating a second set of N candidate vectors; and a multiplexer connected to the first and the second motion vector selectors for selecting the first set of N candidate vectors or the second set of N candidate vectors based on the motion estimation stage signal as the N candidate vectors for output;

N block matchmakers connected to the motion vector selection device for performing a block matching on the N candidate vectors to generate N matching costs respectively; and a motion vector determinator connected to the N block matchmakers and the motion vector selection device for determining an output motion vector of the block based on the N matching costs and feeding the output motion vector back to the motion vector selection device.

2. The estimator as claimed in claim 1, wherein the motion vector determinator feeds output motion vectors of blocks (i−1, j−1), (i−1, j), (i, j−1), (i−1, j+1), (i+1, j+1) of a present image back to the motion vector selection device.

3. The estimator as claimed in claim 2, further comprising a register, which is connected between the motion vector selection device and the motion vector determinator to temporarily store an output motion vector of the block (i, j) of a last image and output the output motion vector to the motion vector selection device.

4. The estimator as claimed in claim 3, wherein the first motion vector selector generates first to fourth penalty costs corresponding to the first to fourth candidate vectors respectively.

5. The estimator as claimed in claim 4, wherein the third penalty cost is greater than the fourth penalty cost when the first update vector is greater than the second update vector, and the third penalty cost is smaller than or equal to the fourth penalty cost when the first update vector is smaller than or equal to the second update vector.

6. The estimator as claimed in claim 5, wherein the second motion vector selector directly outputs the output motion vector of the block (i, j−1) to be a fifth candidate vector, adds a third update vector to the fifth candidate vector to thereby generate a sixth candidate vector, directly outputs the output motion vector of the block (i−1, j+1) to be a seventh candidate vector, and directly outputs the output motion vector of the block (i+1, j+1) to be an eighth candidate vector.

7. The estimator as claimed in claim 6, wherein the second motion vector selector generates fifth to eighth penalty costs corresponding to the fifth to eighth candidate vectors respectively.

8. The estimator as claimed in claim 7, wherein the first and the second update vectors are greater than the third update vector.

9. The estimator as claimed in claim 8, wherein the fifth to eighth penalty costs have the relations: $P5 \leq P7$, $P8 \leq P6$, where $P5$ to $P8$ indicate the fifth to eighth penalty costs respectively.

10. The estimator as claimed in claim 1, wherein the N matching costs are obtained by calculating SAD values of the N candidate vectors and adding the penalty costs corresponding to the N candidate vectors to the SAD values.

* * * * *